United States Patent [19]

Lucier

[11] 4,275,309
[45] Jun. 23, 1981

[54] SYSTEM FOR CONVERTING SOLAR HEAT TO ELECTRICAL ENERGY

[76] Inventor: Robert E. Lucier, 271 Maple Ave., Windsor, Ontario, Canada

[21] Appl. No.: 42,571

[22] Filed: May 25, 1979

Related U.S. Application Data

[63] Continuation of Ser. No. 817,819, Jul. 21, 1977, abandoned, which is a continuation of Ser. No. 621,947, Oct. 14, 1975, abandoned.

[51] Int. Cl.³ .............................................. F03D 11/04
[52] U.S. Cl. ..................................... 290/1 R; 290/44; 290/55
[58] Field of Search ..................... 290/44, 54, 55, 1 R; 60/641

[56] References Cited

U.S. PATENT DOCUMENTS

| 4,018,543 | 4/1977 | Carson | 415/2 |
| 4,118,636 | 10/1978 | Christian | 290/52 |

FOREIGN PATENT DOCUMENTS

| 369199 | 11/1906 | France | 60/641 |
| 675981 | 11/1929 | France | 60/641 |
| 2374533 | 7/1978 | France | 60/641 |

Primary Examiner—J. V. Truhe
Assistant Examiner—D. L. Rebsch
Attorney, Agent, or Firm—Allen D. Gutchess, Jr.

[57] ABSTRACT

This invention consists of a system and apparatus for converting solar heat to electrical energy by accumulating normally sun-heated air under a transparent roof which covers a vast area of sand, gravel, or rock covered ground. The accumulated air is sucked into a very high tower of large diameter which is centrally located on said roof, by the existing air pressure differential. A central pedestal located within the tower, at its base, supports an electrical generator which is powered by an impeller which is activated by the air rising in the tower. A pair of truncated cones joined at their truncated openings provide a reduced area within which the impeller is located in order to increase the air velocity at this point, and the air entering the impeller is previously caused to assure a rotary motion by angular air entrances in an enclosure around said pedestal.

1 Claim, 4 Drawing Figures

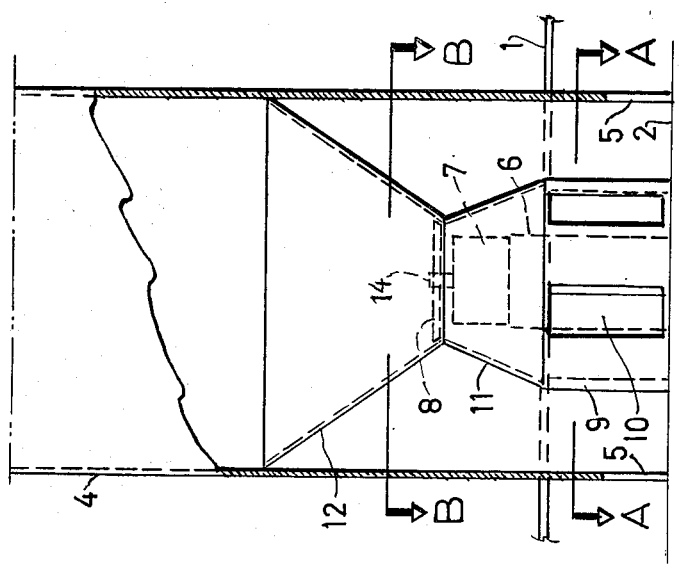
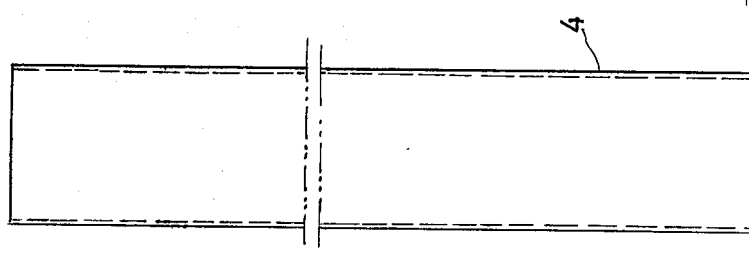
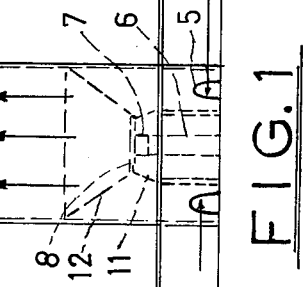
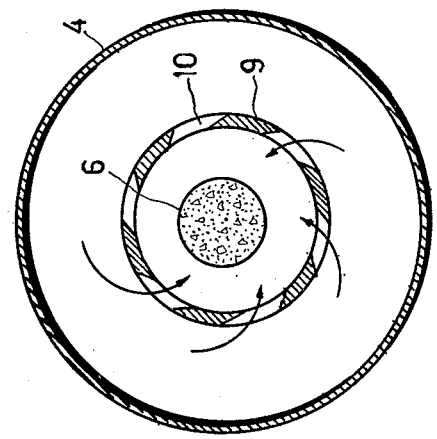
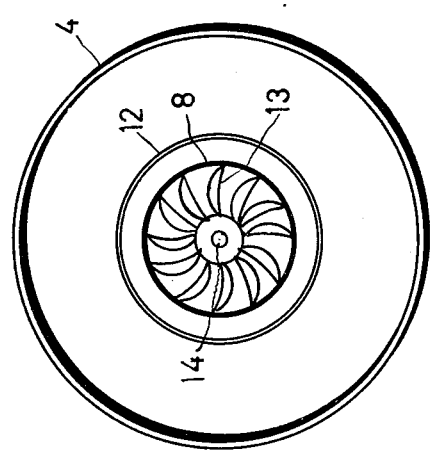

SYSTEM FOR CONVERTING SOLAR HEAT TO ELECTRICAL ENERGY

This is a continuation of application Ser. No. 817,819 filed July 21, 1977, now abandoned, which is in turn a continuation of application Ser. No. 621,947, filed Oct. 14, 1975, also now abandoned.

This invention relates generally to a system and apparatus for converting the heat emitted by the sun, into electrical energy, and particularly by the use of a large volume of air which has been heated naturaly by the sun without the aid of optical, chemical or any other auxilliary heat sources.

The main object of the invention is to provide an endless source of energy at an extremely low cost of production.

Another object of the invention is to provide a system and apparatus which requires a minimum of maintenance, part replacement, and attendance.

The above objectives are accomplished in the invention by accumulating large volumes of sun heated air in one vast area; causing that air to flow upwardly in a very high tower due to air pressure differential; providing a high air velocity area by constricting an area in the tower near its base; and by causing the air of increased velocity to activate an impeller of a generator, which in turn provides electrical power.

In describing the invention reference will be made to the attached drawings in which, FIG. 1 is an elevation of a general layout of the invention, showing the heat accumulator, and tower, FIG. 2 shows an enlongated elevation at the base of the tower, partly in section, FIG. 3 shows section A—A of FIG. 2, and FIG. 4 shows section B—B of FIG. 2.

In the drawings is shown a sun heated air accumulator consisting of a roof 1 which covers a vast area of ground 2 the surface of which consists of sand, gravel, stone, a combination of these components, or any other naturally heat absorbing material preferably black or dark in color. The roof 1 which can be of glass or plastic construction, is spaced from the ground 2 by a plurality of supporting columns 3.

Centrally located on the roof is a tower 4 which extends upwardly to a great height. This tower passes through the roof 1 and is supported by a suitable base in the ground 2. The tower 4 is preferably cylindrical in shape and of a very large diameter as compared to ordinary industrial draft chimneys. At the base, the tower 4 is provided with air intakes 5.

Located at the base of and within the tower 4 is a central cylindrical pedestal 6 which extends above the height of the roof 1 and supports a dynamo 7 which is powered by means of a horizontal impeller 8. The impeller 8 consists of a number of equally spaced cup shaped blades 13 attached to the shaft 14 of the said electrical generator.

Surrounding the pedestal 6 is an air deflector 9. It consists of a cylindrical wall which extends from the ground 2 to the roof 1. It is provided with an open top, and in its wall are a series of air entrances 10, cut at an angle to provide a current of rotating air aimed to strike the impeller blades 13.

Extending from the open top of the air deflector 9 is an upwardly converging truncated cone 11. This truncated open top of the cone 11 is attached to and communicates with an upwardly diverging cone 12. The open top rim of the cone 12 abuts and is attached to the inner wall of the tower 4.

The reduced area at the joint of the cones 11 and 12 increases the air velocity, consequently, the impeller 8 of the electrical generator 7 is located within this area.

The flow of air in the system is indicated by the arrows in the drawings. Due to the particular construction of the unit, it can be seen that the accumulated heated air between the roof 1 and the ground 2 would flow towards the tower base and enter into the base of the tower through the intakes 5. The would then travel to and enter the air deflector 9 through its air entrances 10. Normally this would cause a considerable degree of turbulance within the deflector. However, as the air is drawn in towards the central pedestal 6, the rotational momentum is converted to a higher speed or rotation, the centrifugal force of which causes a reduced pressure near the said pedestal; this results in a highly stable, high speed, rapidly rotating cylinder of air moving swiftly towards the impeller blades thus providing a maximum of efficiency to the impeller.

The efficiency of the impeller and consequently of the entire system will depend also on aerodynamic design of the impeller blades and a certain amount of research without departing from the scope of the invention.

This invention can be installed in almost any of the temperate zones and torrid zones of the earth, particularly in countries where the heat of the sun is strong and unobstructed, the greater part of the day, and where large tracts of sandy and rocky land is available, and which is hitherto being wasted. The height of the roof 1 from the ground 2 can be made large enough to accommodate under it various structures containing equipment which can be powered by the overhead system.

Having described the invention, what I claim is:

1. Apparatus for converting solar heat into electrical energy for installation in vast, torrid, unoccupied areas, said apparatus comprising an accumulator for collecting large quantities of solar heated air and including a roof covering a vast area of ground, said roof being supported and spaced from the ground by a plurality of spaced supports, a huge hollow cylindrical tower centrally located with respect to said roof and passing through said roof and supported on the ground, said tower having spaced air entrances in its base communicating directly with the space between the ground and said roof to receive heated air directly from the space, a solid supporting pedestal centrally located within said tower and supported on the ground, an air deflector including a cylindrical wall spaced around and enclosing said pedestal, said wall having a plurality of angular air inlets communicating with said tower near said tower entrances, the base of said wall also being supported on the ground, said air deflector also having an upwardly-extending, converging, truncated conical portion connected to the upper edge of said cylindrical wall, and said deflector further including an upwardly-extending, diverging, truncated conical portion connected to the upper edge of the converging truncated conical portion, the upper edge of said diverging conical portion being connected to the inner surface of said tower, said diverging conical portion being open and unobstructed and extending only a short distance upwardly relative to the height of said tower, and an electrical generator supported on said pedestal, said generator having a horizontal impeller attached to a shaft of the generator, said impeller being located in the area where said converging and diverging conical portions of said deflector meet, said impeller being rotated by high velocity hot air received from the space between the ground and said roof through said tower entrances and said angular inlets.

* * * * *